United States Patent
Kinoshita

(10) Patent No.: US 9,467,471 B2
(45) Date of Patent: Oct. 11, 2016

(54) ENCRYPTED COMMUNICATION APPARATUS AND CONTROL METHOD THEREFOR

(71) Applicant: CANON KABUSHIKI KAISHA, Tokyo (JP)

(72) Inventor: Akihisa Kinoshita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 14/043,069

(22) Filed: Oct. 1, 2013

(65) Prior Publication Data

US 2014/0101435 A1 Apr. 10, 2014

(30) Foreign Application Priority Data

Oct. 10, 2012 (JP) .................................. 2012-225368

(51) Int. Cl.
*H04L 29/06* (2006.01)

(52) U.S. Cl.
CPC .................................. *H04L 63/164* (2013.01)

(58) Field of Classification Search
CPC .................................................... H04L 63/164
See application file for complete search history.

(56) References Cited

U.S. PATENT DOCUMENTS

| | | | |
|---|---|---|---|
| 8,261,055 B2* | 9/2012 | Sakai | H04L 63/164 380/28 |
| 2002/0188871 A1* | 12/2002 | Noehring et al. | 713/201 |
| 2003/0196081 A1* | 10/2003 | Savarda et al. | 713/153 |
| 2008/0310448 A1* | 12/2008 | Hanov | H04L 1/0007 370/470 |

FOREIGN PATENT DOCUMENTS

JP    2006165847 A    6/2006

OTHER PUBLICATIONS

Kent et al.; RFC 2401—Security Architecture for the Internet Protocol; 1998; Retrieved from the Internet <URL:tools.ietf.org/pdf/rfc2401.pdf>; pp. 1-66 as printed.*
Kent et al.; RFC 4301—Security Architecture for the Internet Protocol; 2005; Retrieved from the Internet <URL:tools.ietf.org/pdf/rfc4301.pdf>; pp. 1-101 as printed.*
Kent et al.; RFC 2406—IP Encapsulating Security Payload (ESP); 1998; Retrieved from the Internet <URL:tools.ietf.org/pdf/rfc2406.pdf>; pp. 1-22 as printed.*

* cited by examiner

*Primary Examiner* — Saleh Najjar
*Assistant Examiner* — Oleg Korsak
(74) *Attorney, Agent, or Firm* — Fitzpatrick, Cella, Harper & Scinto

(57) ABSTRACT

An encrypted communication apparatus determines a security protocol in IPsec to be applied to an IP packet, and calculates, based on the determined security protocol, a packet size which prevents the IP packet from being fragmented even if IPsec is applied to the IP packet. The packet size to be calculated is independent of an encryption algorithm and authentication algorithm which are actually specified by the determined security protocol.

10 Claims, 7 Drawing Sheets

FIG. 8

| COMMUNICATION PARTNER | AH | ESP | ESP<br>ESP Auth | AH<br>ESP | AH<br>ESP<br>ESP Auth |
|---|---|---|---|---|---|
| TRANSMISSION SOURCE INFORMATION 1<br>DESTINATION INFORMATION 1<br>PROTOCOL INFORMATION 1 | 24byte | | | | |
| TRANSMISSION SOURCE INFORMATION 2<br>DESTINATION INFORMATION 2<br>PROTOCOL INFORMATION 2 | | | | 58byte | |
| TRANSMISSION SOURCE INFORMATION 3<br>DESTINATION INFORMATION 3<br>PROTOCOL INFORMATION 3 | | | 42byte | | |
| TRANSMISSION SOURCE INFORMATION 4<br>DESTINATION INFORMATION 4<br>PROTOCOL INFORMATION 4 | | 26byte | | | |
| TRANSMISSION SOURCE INFORMATION 5<br>DESTINATION INFORMATION 5<br>PROTOCOL INFORMATION 5 | | | | | 74byte |

ENCRYPTED COMMUNICATION APPARATUS AND CONTROL METHOD THEREFOR

BACKGROUND OF THE INVENTION

1. Field of the Invention

The present invention relates to security for data transmission/reception via a network and, more particularly, to a technique of controlling an IP packet size to prevent IP fragmentation in communication using IPsec.

2. Description of the Related Art

In recent years, there has been an increasing demand for security on a network, especially for security using encrypted communication. There are some protocols as security protocols. Among them, IPsec (IP Security Protocol) includes a mechanism for authenticating a transmission source and assurance of data integrity by the AH (Authentication Header) protocol. In addition, IPsec includes a mechanism of assuring the confidentiality of an IP packet, security assurance, and authentication of a transmission source by the ESP (Encapsulating Security Payload) protocol. Since IPsec is a security protocol implemented at the IP level (the network layer in the open systems interconnection (OSI) reference model), AH processing and ESP processing are executed for each IP packet. IPsec technology is defined in RFC2401, RFC2402, RFC2406, and the like.

In communication using IPs, an MTU (Maximum Transmission Unit) is defined as a maximum data amount which can be transmitted in one transfer operation. To transmit an IP packet, the amount of which exceeds the MTU, the IP packet undergoes IP fragmentation and is then transmitted. As a technique of preventing IP fragmentation, PMTU (Path MTU Discovery) is defined in RFC1191 and RFC1981.

Japanese Patent Laid-Open No. 2006-165847 discloses a technique of optimizing the packet length of a communication packet using IPsec by maximizing it within the range of PMTU.

The size of an IP packet after IPsec application increases due to the ESP processing or AH processing, as compared with the IP packet size before IPsec application. If, therefore, the IP packet size before IPsec application is close to the MTU, the IP packet is fragmented. Since the fragmentation of the IP packet includes IP packet division processing on the transmission side and IP packet reconstruction processing on the reception side, the communication speed decreases.

To prevent an IP packet after IPsec application from being fragmented, it is possible to make the MTU value small by PMTU. However, PMTU uses an ICMP packet, so the IP packet may be discarded in a firewall. In addition, an IP packet size increment due to IPsec application is not strictly considered, and thus an IP packet after IPsec application may be fragmented. Even if the MTU value is changed to a value which prevents an IP packet from being fragmented, it is not ensured that the size of an IP packet is maximized within the range in which the IP packet is not fragmented. Since, therefore, an IP packet is not fragmented but the MTU value is small, the size of the IP packet becomes small, thereby decreasing the communication speed.

SUMMARY OF THE INVENTION

The present invention has been made in consideration of the above problems, and implements, when applying IPsec to an IP packet, encrypted communication in which the size of the IP packet is maximized within the range in which the IP packet is not fragmented. Furthermore, the present invention minimizes the calculation amount of calculation of a maximum IP packet size which prevents the IP packet from being fragmented upon application of IPsec.

According to one aspect of the present invention, an encrypted communication apparatus implementing IPsec comprises a determination unit configured to determine a security protocol in IPsec to be applied to an IP packet, and a calculation unit configured to calculate, based on the security protocol determined by the determination unit, a packet size which prevents the IP packet from being fragmented even if IPsec is applied to the IP packet, wherein the packet size is independent of an encryption algorithm and authentication algorithm which are actually specified by the security protocol determined by the determination unit.

Further features of the present invention will become apparent from the following description of exemplary embodiments with reference to the attached drawings.

BRIEF DESCRIPTION OF THE DRAWINGS

FIG. 8 is a view showing an example of a table generated after calculating a data size increment due to IPsec application.

DESCRIPTION OF THE EMBODIMENTS

Various exemplary embodiments, features, and aspects of the invention will be described in detail below with reference to the drawings.

Preferred embodiments of the present invention will be described in detail below with reference to the accompanying drawings. Note that the present invention is not limited to the following embodiments, which are merely practical examples advantageous to the implementation of the present invention. In addition, not all combinations of characteristic features described in the embodiments are essential to the solution of the problems in the present invention.

First Embodiment

Figure 1:
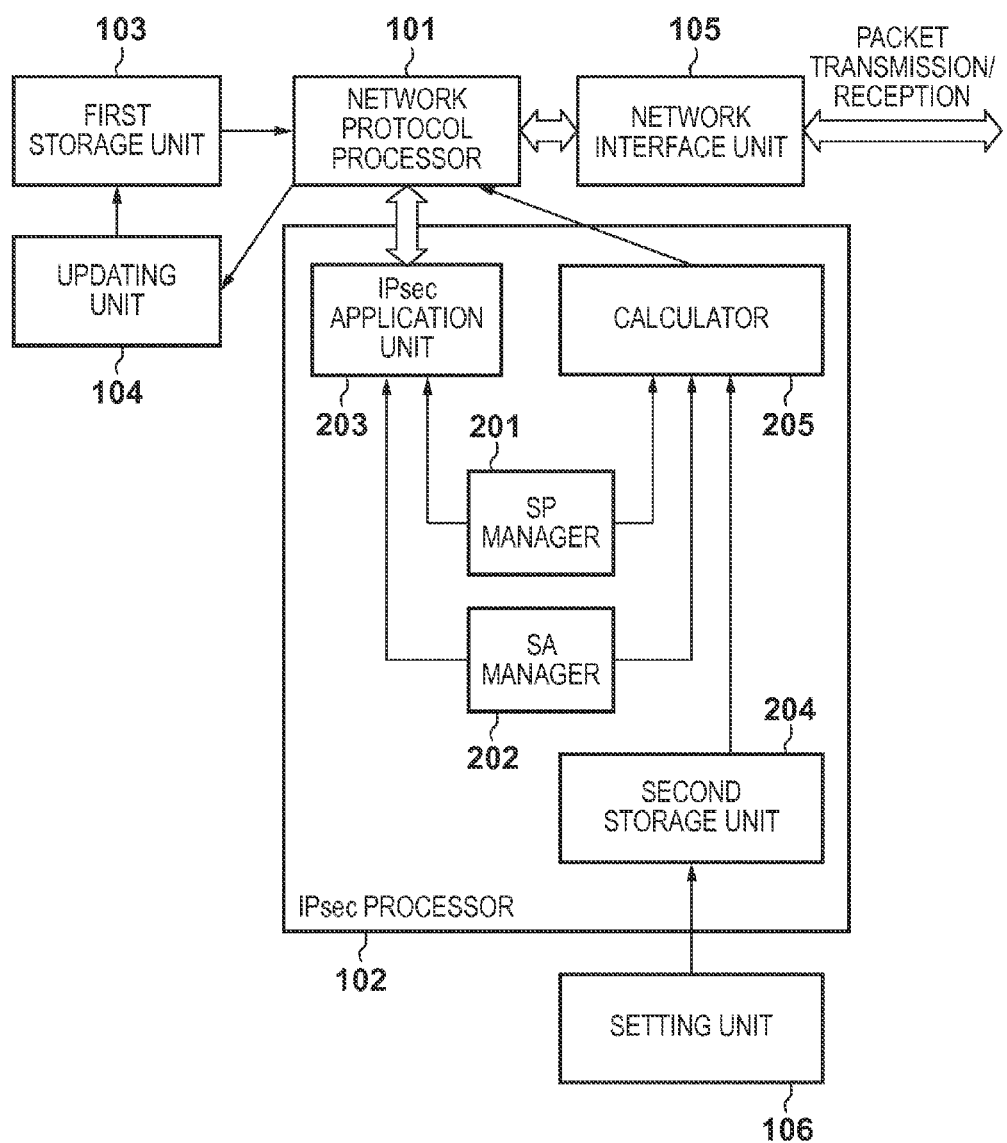
FIG. 1 is a block diagram showing the arrangement of an encrypted communication apparatus according to an embodiment.

In the first embodiment, encrypted communication which prevents fragmentation of an IP packet by an increase in data size upon IPsec application will be described. FIG. 1 is a block diagram showing the arrangement of an encrypted communication apparatus according to the embodiment.

The encrypted communication apparatus according to the embodiment has an arrangement for ensuring the security of data flowing on a network by applying IPsec to an IP packet. More specifically, as shown in FIG. 1, the encrypted communication apparatus implementing IPsec includes a network protocol processor 101, an IPsec processor 102, and a first storage unit 103. The encrypted communication apparatus also includes an updating unit 104, a network interface unit 105, and a setting unit 106. The IPsec processor 102 has an arrangement for executing control associated with IPsec. More specifically, the IPsec processor 102 includes an SP manager 201, an SA manager 202, an IPsec application unit 203, a second storage unit 204, and a calculator 205.

The network protocol processor 101 indicates the network layer or an upper layer of the OSI reference model, and processes a protocol function for communication via a network. More specifically, the network protocol processor 101 divides an IP packet based on a maximum transmission data size stored in the first storage unit 103, and transfers the divided IP packet to the network interface unit 105. The IPsec processor 102 executes processing of applying IPsec to the IP packet received from the network protocol processor 101. The first storage unit 103 stores the maximum transmission data size which prevents the IP packet from being fragmented. The updating unit 104 acquires, via the network protocol processor 101, the packet size increment due to IPsec application to the IP packet, which has been calculated by the calculator 205. After that, the updating unit 104 changes the maximum transmission data size stored in the first storage unit 103. The network interface unit 105 indicates the data link layer and physical layer of the OSI reference model, and transmits the IP packet to the network.

The encrypted communication apparatus can use a plurality of encryption algorithms and a plurality of authentication algorithms. The second storage unit 204 stores, in advance, information of a packet size increment due to IPsec application for an encryption algorithm and authentication algorithm with which the packet size increment becomes maximum. The setting unit 106 can set, in the second storage unit 204, information of the packet size increment due to IPsec application to the IP packet.

In this embodiment, IP packet data used in the encrypted communication apparatus is a data unit transmitted/received on the Internet. A method of packaging IP packet data is irrelevant to the present invention, and a description thereof will be omitted. Furthermore, the SP manager 201 and SA manager 202 may be those well known in encrypted communication using general IPsec, and are irrelevant to the present invention, and a description thereof will be omitted. Key exchange needed before starting encrypted communication is assumed to be performed using a well-known method such as IKE or SSL. Details of such key exchange are irrelevant to the present invention, and a description thereof will be omitted.

The arrangement of the IPsec processor 102 will now be described with reference to FIG. 1. The SP manager 201 manages an SPD (Security policy database) in which security policies (SPs) are registered. The SP describes processing ("discard", "bypass IPsec", or "apply IPsec") executed for an IP packet. If the SP specifies "apply IPsec", it also specifies a security protocol (AH/ESP), encapsulation mode (tunnel mode/transport mode), and the like to be applied. The SA manager 202 manages an SAD (security association database) in which security associations (SAs) are stored. The SA defines the parameters of the authentication and encryption algorithms to be performed for an IP packet upon transmission and upon reception.

The IPsec application unit 203 applies IPsec to an IP packet received from the network protocol processor 101. Processing executed by the IPsec application unit 203 upon transmission is as follows. To determine whether to apply IPsec to the IP packet, the unit 203 searches the SPD managed by the SP manager 201 for an SP (security policy) based on pieces of information of the start IP address, end IP address, protocol, port number of the IP packet. If the SP specifies "discard", the unit 203 discards the IP packet. If the SP specifies "bypass IPsec", the unit 203 transfers the IP packet to the network protocol processor 101 without applying IPsec. If the SP specifies "apply IPsec", the unit 203 searches the SAD managed by the SA manager 202 for an SA (security association). The unit 203 uses algorithms and keys described in the found SA to execute encryption processing, and then transfers the IP packet after IPsec application to the network protocol processor 101.

Processing executed by the IPsec application unit 203 upon reception is as follows. The unit 203 determines whether IPsec has been applied to the IP packet. If IPsec has not been applied, the unit 203 searches the SPD managed by the SP manager 201 for an SP. If the found SP specifies "discard", the unit 203 discards the IP packet. If the SP specifies "apply IPsec", the unit 203 discards the IP packet because IPsec has not been applied to the IP packet. If the SP specifies "bypass IPsec", the received IP packet satisfies the condition, and thus the unit 203 transfers the IP packet to the network protocol processor 101. Alternatively, if IPsec has been applied, the unit 203 searches the SAD managed by the SA manager 202 for an SA, and uses algorithms and keys described in the found SA to perform decoding processing. After performing the decoding processing, the unit 203 searches the SPD for an SP, and determines whether contents of the found SP coincide with those applied to the received IP packet. If the contents do not coincide, the unit 203 discards the IP packet; otherwise, the unit 203 transfers the IP packet to the network protocol processor 101.

Figure 2:
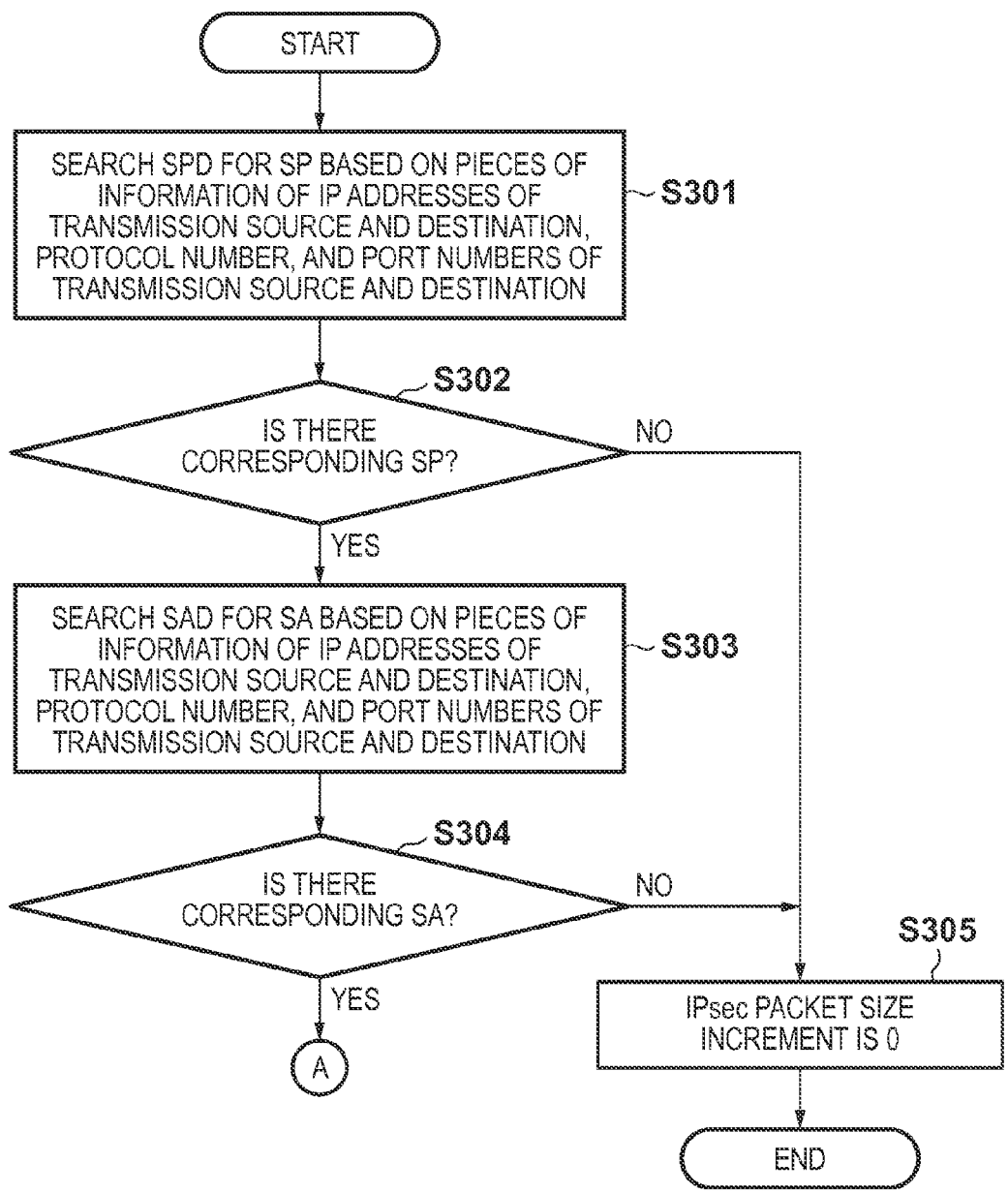
FIGS. 2 and 3 are flowcharts illustrating processing of calculating a data size increment due to IPsec application to an IP packet.
Figure 3:
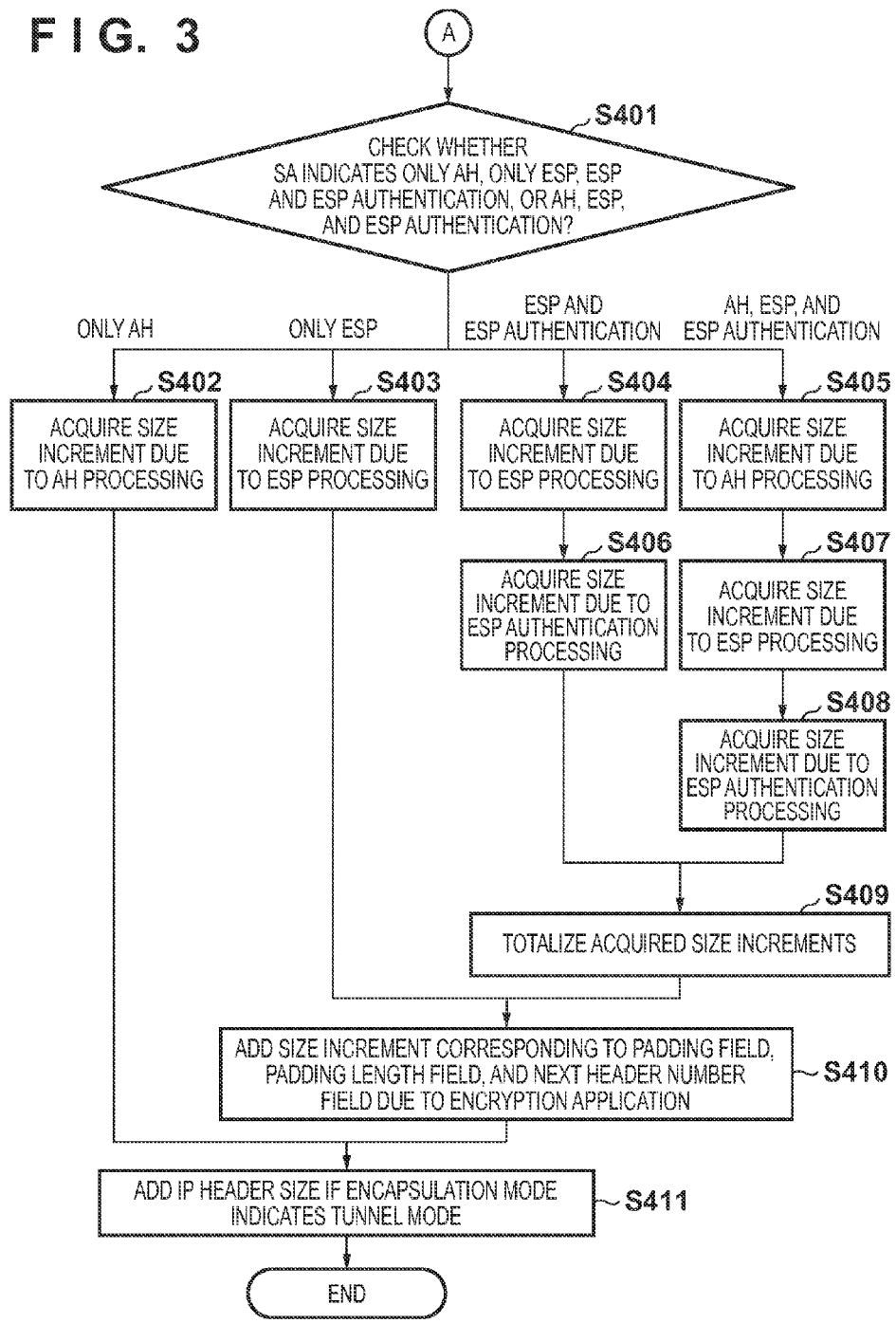

A procedure of calculating a data size increment due to IPsec application will be described with reference to flowcharts shown in FIGS. 2 and 3. Processing corresponding to the flowcharts is executed by the calculator 205.

In step S301, the calculator 205 receives pieces of information of IP addresses of a transmission source and destination, a protocol number, the port numbers of the transmission source and destination from the network protocol processor 101. The calculator 205 searches the SPD managed by the SP manager 201 for an SP corresponding to the pieces of information. In step S302, the calculator 205 determines the SP search result. If there is no corresponding SP, the process advances to step S305, and the packet size increment due to IPsec application is 0, thereby terminating the process. If there is a corresponding SP, the process advances to step S303, and the calculator 205 searches the SAD managed by the SA manager 202 for an SA corresponding to the pieces of information of the IP addresses of the transmission source and destination, the protocol number, and the port numbers of the transmission source and destination. In step S304, the calculator 205 determines the SA search result. If there is no corresponding SA, the process advances to step S305, and the packet size increment due to IPsec application is 0, thereby terminating the process. If there is a corresponding SA, the process advances to step S401.

In step S401, the calculator 205 determines a security protocol in IPsec to be applied to the IP packet. More specifically, the calculator 205 receives SA parameters described in the found SA, and also receives information of a maximum transmission data size before IPsec application. After that, the calculator 205 checks whether the type of security protocol of the received SA parameters indicates only AH (authentication header), only ESP (encryption payload), ESP and ESP authentication, or AH, ESP, and ESP authentication. Processing according to the determined security protocol is executed.

If the type of security protocol of the SA parameters indicates only AH, the process advances to step S402 to acquire, from the second storage unit 204, the packet size increment due to AH processing, and then advances to step S411. If the type of security protocol of the SA parameters indicates only ESP, the process advances to step S403 to acquire, from the second storage unit 204, the packet size increment due to ESP processing, and then advances to step S410. If the type of security protocol of the SA parameters indicates ESP and EPS authentication function, the process advances to step S404 to acquire, from the second storage unit 204, the packet size increment due to ESP processing. In step S406, the calculator 205 acquires, from the second storage unit 204, the packet size increment due to ESP authentication function processing. After that, the process advances to step S409. If the type of security protocol of the SA parameters indicates AH, ESP, and ESP authentication function, the process advances to step S405 to acquire, from the second storage unit 204, the packet size increment due to AH processing. In step S407, the calculator 205 acquires, from the second storage unit 204, the packet size increment due to ESP processing. In step S408, the calculator 205 acquires, from the second storage unit 204, the packet size increment due to ESP authentication function processing. After that, the process advances to step S409.

In step S409, the calculator 205 totalizes all the acquired packet size increments due to IPsec application. After that, the process advances to step S410. In step S410, the calculator 205 adds, to the value calculated in step S409, an increment corresponding to a padding field, padding length field, and next header number field which are necessary for encryption application in ESP processing. The process then advances to step S411. In step S411, only if the encapsulation mode of the SA parameters indicates a tunnel mode, the calculator 205 adds an IP header size increment to the value calculated in step S410, and terminates the process.

Figure 4:
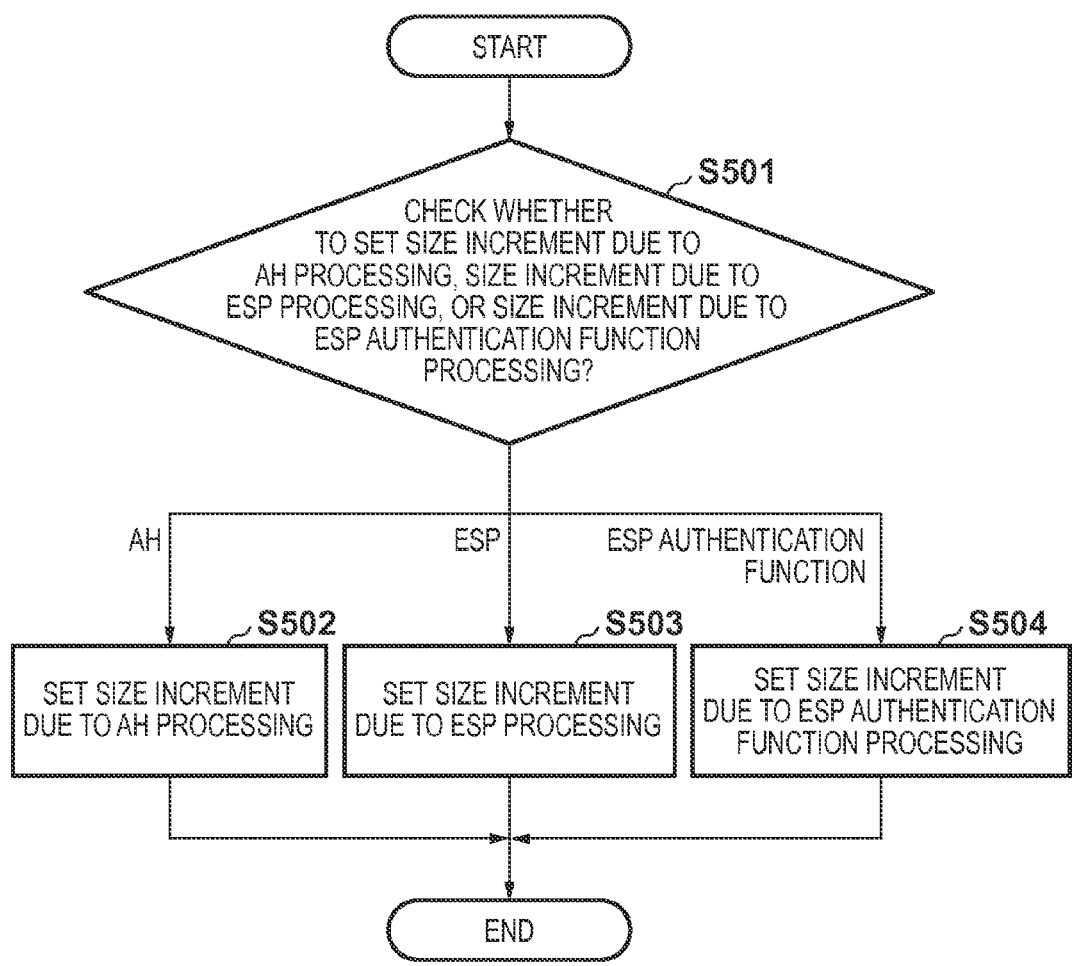
FIG. 4 is a flowchart illustrating processing of setting a data size which prevents an IP packet from being fragmented.

A processing procedure of setting, in the second storage unit 204, a data size increment due to IPsec application, which is executed by the setting unit 106, will be described with reference to a flowchart shown in FIG. 4.

In step S501, the unit 106 checks whether to set a data size increment due to execution of AH processing, that due to ESP processing, or that due to ESP authentication function processing.

If a data size increment due to execution of AH processing is to be set, the process advances to step S502. In step S502, the unit 106 sets, in the second storage unit 204, a data size increment in association with the AH.

If a data size increment due to execution of ESP processing is to be set, the process advances to step S503. In step S503, the unit 106 sets, in the second storage unit 204, a data size increment in association with the ESP.

If a data size increment due to execution of ESP authentication function processing is to be set, the process advances to step S504. In step S504, the unit 106 sets, in the second storage unit 204, a data size increment in association with the ESP authentication function.

Figure 5:
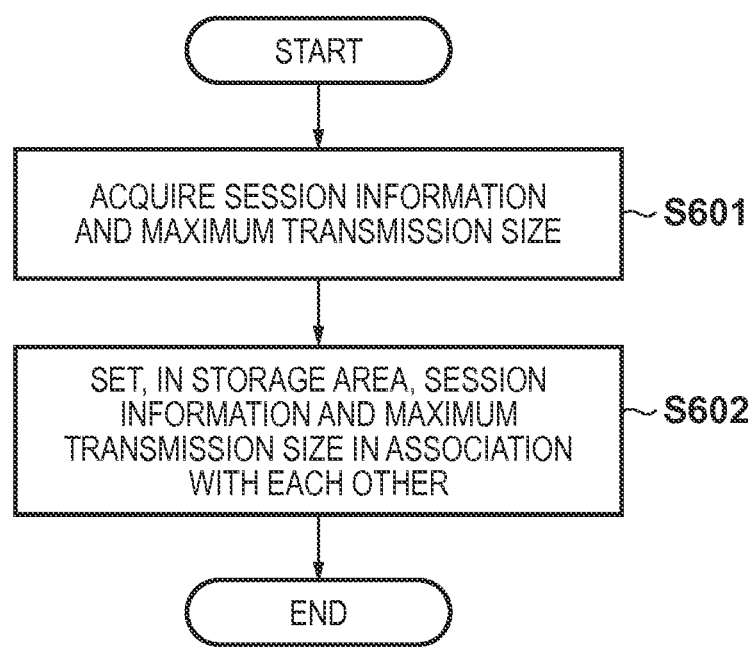
FIG. 5 is a flowchart illustrating processing of setting a data size increment due to IPsec application to an IP packet.

A processing procedure of setting, in the first storage unit 103, a maximum transmission packet size that prevents the IP packet from being fragmented, which is executed by the updating unit 104, will be explained with reference to a flowchart shown in FIG. 5.

In step S601, the unit 104 acquires, from the network protocol processor 101, session information and a maximum transmission packet size which prevents the IP packet from being fragmented. In step S602, the unit 104 sets, in the storage are of the first storage unit 103, in association with each other, the session information and the maximum transmission packet size which prevents the IP packet from being fragmented. In this way, the unit 104 updates the maximum transmission packet size which prevents the IP packet from being fragmented.

As described above, the second storage unit 204 stores, in advance, information of the packet size increment due to IPsec application for an encryption algorithm and authentication algorithm with which the packet size increment becomes maximum. A maximum transmission packet size is calculated by assuming that the encrypted communication apparatus uses, among a plurality of encryption algorithms and a plurality of authentication algorithms usable by the apparatus, an encryption algorithm and authentication algorithm with which the packet size increment becomes maximum. That is, this calculation operation is independent of an encryption algorithm and authentication algorithm actually specified by the determined security protocol.

Second Embodiment

In the second embodiment, the following communication apparatus will be described.

HMAC-MD5 or HMAC-SHA1 is usable as an authentication algorithm.

DES-CBC, 3DES-CBC, or AES-CBC is usable as an encryption algorithm.

IPsec mode is a transport mode.

MTU is 1500 bytes.

Processing, in this communication apparatus, of preventing fragmentation of an IPv4 packet in TCP communication, caused by an increase in data size due to IPsec application will be explained below with reference to a block diagram shown in FIG. 1.

A setting unit 106 sets the following pieces of information in a second storage unit 204.

Maximum size increment due to execution of ESP processing by usable encryption algorithm Maximum size increment due to execution of ESP authentication function processing or AH processing by usable authentication algorithm A data size set in the second storage unit 204 will be described below.

(1) Data Size Increment Due to AH Processing

Figure 6:
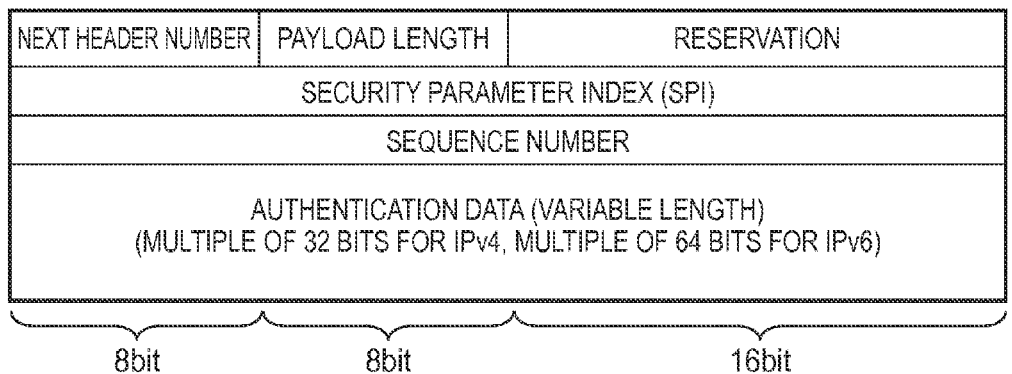
FIG. 6 is a view showing an example of the AH (authentication header) format.

AH processing adds the authentication header format shown in FIG. 6 to an IP packet. Each of a next header number field, payload length field, reservation field, SPI (security parameter index) field, and sequence number field has a fixed length independent of an authentication algorithm. On the other hand, an authentication data field depends on an authentication algorithm and IP protocol version. For HMAC-MD5, HMAC-SHA1, and IPv4 protocol according to this embodiment, the authentication data field has a length of 12 bytes defined in RFC2403 and RFC2404.

Figure 7:
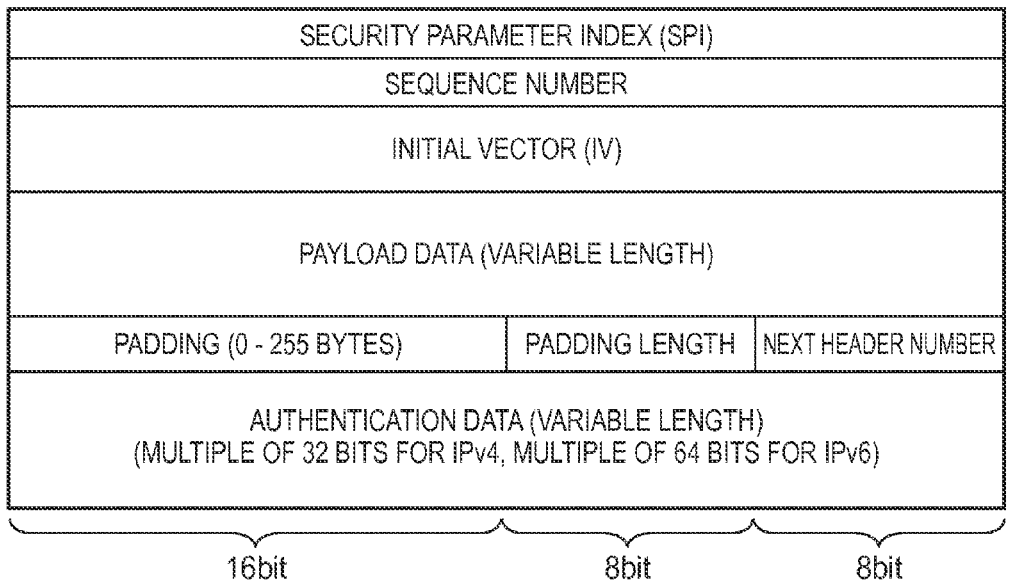
FIG. 7 is a view showing an example of the ESP (encryption payload) packet format.

The data size increment due to AH processing is 24 bytes, as given by:

1 byte(next header number size)+1 byte (payload length size)+2 bytes(reservation size)+4 bytes (SPI size)+4 bytes(sequence number size)+12 bytes(authentication data size)=24 bytes (2) Data Size Increment Due to ESP Processing ESP processing adds the encryption payload format shown in FIG. 7 to an IP header. Each of an SPI field, sequence number field, padding length field, and next header number field has a fixed length independent of an encryption algorithm. On the other hand, each of an initial vector field, payload data field, and padding field depends on an encryption algorithm, IP protocol version, and MTU. In AES-CBC among DES-CBC, 3DES-CBC, and AES-CBC according to this embodiment, a data size increment is larger than the initial vector size and the block size. The initial vector and block size are defined in RFC2405, RFC2451, and RFC3602.

If the MTU is 1500 bytes for an IPv4 packet, in the ESP processing in AES-CBC, the initial vector size is 16 bytes, the block size is 16 bytes, and a data size increment is 26 bytes, as given by
    MTU=1500 bytes
    IPv4 header size=20 bytes
    SPI size=4 bytes
    sequence number size=4 bytes
    initial vector size=16 bytes
    block size=16 bytes
    padding length size=1 byte
    next header size=1 byte
    payload data size=MTU−IPv4 header size
    =1500−20
    =1480 bytes
    encryption target payload data size=payload data size−SPI size−sequence number size−initial vector size
    =1480−4−4−16
    =1456 bytes
    padding=encryption target payload data size mod block size
    =1456 mod 16=0 byte
    data size increment=payload data size−(encryption target payload data size−padding−padding length size−next header size)
    1480−(1456−0−1−1)
    =26 bytes (3) Data Size Increment Due to ESP Processing and ESP Authentication Processing By performing ESP processing and ESP authentication processing, the encryption payload format shown in FIG. 7 is added to an IP header. Each of an SPI field, sequence number field, padding length field, and next header number field has a fixed length independent of an encryption algorithm. On the other hand, each of an initial vector field, payload data field, and padding field depends on an encryption algorithm, IP protocol version, and MTU. In AES-CBC among DES-CBC, 3DES-CBC, and AES-CBC according to this embodiment, a data size increment is larger than the initial vector size and the block size. The initial vector and block size are defined in RFC2405, RFC2451, and RFC3602. The authentication data of the ESP authentication processing depends on the type of authentication algorithm. For HMAC-MD5, HMAC-SHA1, and IPv4 protocol according to this embodiment, the authentication data has a length of 12 bytes defined in RFC2403 and RFC2404.

If the MTU is 1500 bytes for an IPv4 packet, in the ESP processing in AES-CBC, the initial vector size is 16 bytes, the block size is 16 bytes, and the authentication data size of the ESP authentication processing is 12 bytes. The data size increment is 42 bytes, as given by:
    MTU=1500 bytes
    IPv4 header size=20 bytes
    SPI size=4 bytes
    sequence number size=4 bytes
    initial vector size=16 bytes
    block size=16 bytes
    padding length size=1 byte
    next header size=1 byte
    ESP authentication data=12 bytes
    payload data size=MTU−IPv4 header size
    =1500−20
    =1480 bytes
    encryption target payload data size=payload data size−SPI size−sequence number size−initial vector size−ESP authentication data
    =1480−4−4−16−12
    =1444 bytes
    padding=encryption target payload data size mod block size
    =1444 mod 16=4 bytes
    data size increment=payload data size−(encryption target payload data size−padding−padding length size−next header size)
    =1480−(1444−4−1−1)
    −42 bytes (4) Data Size Increment Due to AH Processing and ESP Processing If AH processing and ESP processing are performed, a data size increment due to the AH processing which is 24 bytes (see (1) described above) is used to obtain an encryption target payload data size when calculating a data size increment due to the ESP processing (see (2) described above). The data size increment due to the AH processing and ESP processing is 58 bytes, as given by:
    MTU=1500 bytes
    IPv4 header size=20 bytes
    AH processing size increment=24 bytes
    SPI size=4 bytes
    sequence number size=4 bytes
    initial vector size=16 bytes
    block size=16 bytes
    padding length size=1 byte
    next header size=1 byte
    payload data size=MTU−IPv4 header size
    =1500−20
    =1480 bytes
    encryption target payload data size=payload data size−AH processing data size increment−SPI size−sequence number size−initial vector size
    =1480−24−4−4−16
    =1432 bytes
    padding=encryption target payload data size mod block size
    =1432 mod 16=8 bytes
    data size increment=payload data size=(encryption target payload data size−padding−padding length size−next header size)
    =1480−(1432−8−1−1)
    =58 bytes (5) Data Size Increment Due to AH Processing, ESP Processing, and ESP Authentication Processing If AH processing, ESP processing, and ESP authentication processing are performed, a data size increment due the AH processing which is 24 bytes (see (1) described above) is used to obtain an encryption target payload data size when calculating a data size increment due to the ESP processing and ESP authentication processing (see (3) described above). The data size increment due to the AH processing, ESP processing, and ESP authentication processing is 74 bytes, as given by:
    MTU=1500 bytes
    IPv4 header size=20 bytes
    AH processing size increment=24 bytes SPI size=4 bytes
sequence number size=4 bytes
initial vector size=16 bytes
block size=16 bytes
padding length size=1 byte
next header size=1 byte
ESP authentication data=12 bytes
payload data size=MTU−IPv4 header size
=1500−20
1480 bytes
encryption target payload data size=payload data size−AH processing data size increment−SPI size−sequence number size−initial vector size−ESP authentication data
=1480−24−4−4−16−12
=1420 bytes
padding=encryption target payload data size mod block size
=1420 mod 16=12 bytes
data size increment=payload data size−(encryption target payload data size−padding−padding length size−next header size)
=1480−(1420−12−1−1)
=74 bytes A network protocol processor 101 establishes a connection while data is transferred in communication using TCP. To establish a connection, processing called three-way handshaking is executed. Since the size of the SYN packet transmitted in the three-way handshaking is smaller than the MTU even if IPsec is applied, the packet is not fragmented. Upon transmitting or receiving the SYN packet in the three-way handshaking, a calculator 205 calculates a maximum transmission size which prevents the IP packet from being fragmented even if IPsec is applied. The network protocol processor 101 transfers, to the calculator 205, the IP addresses of a transmission source and destination, a TCP protocol number, the port numbers of the transmission source and destination, and the maximum transmission size (MTU) which prevents fragmentation before IPsec application. Based on the pieces of information of the IP addresses of the transmission source and destination, the TCP protocol number, and the port numbers of the transmission source and destination, the calculator 205 searches an SP manager 201 for an SP, and searches an SA manager 202 for an SA. If the found SA indicates that three processes, that is, AH processing, ESP processing, and ESP authentication function processing, need to be executed, the calculator 205 calculates the size increment according to flowcharts shown in FIGS. 3 and 4. The calculated size increment is sent to the network protocol processor 101. TCP in the network protocol processor 101 uses an updating unit 104 to set the sent size increment in a first storage unit 103. TCP sets, for example, the maximum transmission data size in a TCB (Transmission Control Block) for managing the connection. With this operation, after completion of the three-way handshaking, data is transferred by the maximum transmission data size obtained by considering IPsec application. Therefore, even after the IPsec application unit 203 applies IPsec to the IP packet, the network interface unit 105 transmits the IP packet to the network without fragmenting the IP packet.

Third Embodiment

In the third embodiment, in processing of preventing fragmentation of an IP packet which is caused by an increase in data size due to IPsec application, a calculator 205 executes the following processing. That is, the calculator 205 stores, in a database for each communication partner, a maximum transmission packet size calculated using the calculation method according to the first or second embodiment. FIG. 8 shows an example of the database.

In the database shown in FIG. 8, the following pieces of information are described for each communication partner.
maximum size increment due to AH processing
maximum size increment due to ESP processing
maximum size increment due to SP processing and ESP processing
maximum size increment due to AH processing and ESP processing
maximum size increment due to AH processing, ESP processing, and ESP authentication processing A network protocol processor 101 transfers the following pieces of information to the calculator 205.
IP addresses of transmission source and destination
TCP protocol number
port numbers of transmission source and destination
maximum transmission size (MTU) which prevents fragmentation before IPsec application The calculator 205 searches the database shown in FIG. 8 for the packet size increment based on the pieces of information of the IP addresses of the transmission source and destination, the protocol number, and the port numbers of the transmission source and destination. The network protocol processor 101 acquires the found packet size increment from the calculator 205.

The database is maintained while there are SAs managed by an SA manager 202. However, when all SAs corresponding to a communication partner are deleted, a corresponding entry in the database is also deleted.

According to the above-described embodiment of the present invention, upon IPsec application, an IP packet is transmitted to a network by a maximum size smaller than the MTU. This prevents the communication speed from decreasing due to fragmentation of the IP packet. Furthermore, calculation of the packet size increment due to IPsec application is independent of an encryption algorithm or authentication algorithm, thereby enabling minimization of the calculation amount of the calculation operation. Since calculation of the packet size increment due to IPsec application is performed only upon start of a connection, the influence on the communication speed is small.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-225368, filed Oct. 10, 2012, which is hereby incorporated by reference herein in its entirety.

What is claimed is:

1. A communication apparatus comprising:
a processor; and
a memory including instructions that, when executed by the processor, cause the apparatus to function as:
a first unit configured to execute encryption processing based on a first IPSec protocol using a first encryption algorithm;
a second unit configured to execute encryption processing based on the first IPSec protocol using a second encryption algorithm;
a third unit configured to execute authentication processing based on a second IPSec protocol using a first authentication algorithm;
a fourth unit configured to execute authentication processing based on the second IPSec protocol using a second authentication algorithm,
wherein a first area of the memory stores the larger one of (i) an increment of a size of an IP header when executing the encryption processing by the first unit and (ii) an increment of the size of the IP header when executing the encryption processing by the second unit, and does not store the other one;
wherein a second area of the memory stores the larger one of (a) an increment of the size of the IP header when executing the authentication processing by the third unit and (b) an increment of the size of the IP header when executing the authentication processing by the fourth unit, and does not store the other one;
a setting unit configured to:
set a size of data to be transmitted to another communication apparatus using a packet, based on the increased size stored in the first area, when executing the encryption processing based on the first IPSec protocol, regardless of whether the encryption processing is executed by the first unit or by the second unit; and
set a size of data to be transmitted to the other communication apparatus using a packet, based on the increased size stored in the second area, when executing the authentication processing based on the second IPSec protocol, regardless of whether the authentication processing is executed by the third unit or by the fourth unit; and
a transmission unit configured to transmit the packet including data which does not exceed the set size to the other communication apparatus.

2. The apparatus according to claim 1, wherein the first IPsec protocol is based on ESP (encryption payload), and the second IPSec protocol is based on AH (authentication header).

3. The apparatus according to claim 1, wherein the setting unit is configured to:
set a size of data to be transmitted to the other communication apparatus using a packet, based on the increased size stored in the first area and MTU (Maximum Transmission Unit), when executing the encryption processing based on the first IPSec protocol, regardless of whether the encryption processing is executed by the first unit or by the second unit; and
set a size of data to be transmitted to the other communication apparatus using a packet, based on the increased size stored in the second area and MTU (Maximum Transmission Unit), when executing the authentication processing based on the second IPSec protocol, regardless of whether the authentication processing is executed by the third unit or by the fourth unit.

4. The apparatus according to claim 3, further comprising an update unit configured to update MTU.

5. The apparatus according to claim 1, wherein the instructions cause the apparatus to further function as:
a dividing unit configured to divide data based on the set size.

6. The apparatus according to claim 1, wherein the first encryption algorithm is based on DES, and the second encryption algorithm is based on AES.

7. The apparatus according to claim 1, wherein the first authentication algorithm is based on HMAC-MD5, and the second authentication algorithm is based on HMAC-SHA1.

8. The apparatus according to claim 1, further comprising:
a fifth unit configured to execute encryption and authentication processing based on a third IPSec protocol using the first encryption algorithm and the first authentication algorithm;
a sixth unit configured to execute encryption and authentication processing based on the third IPSec protocol using the first encryption algorithm and the second authentication algorithm;
a seventh unit configured to execute encryption and authentication processing based on the third IPSec protocol using the second encryption algorithm and the first authentication algorithm; and
an eighth unit configured to execute encryption and authentication processing based on the third IPSec protocol using the second encryption algorithm and the second authentication algorithm,
wherein a third area of the memory stores the largest one of:
an increment of the size of the IP header when executing the authentication processing by the fourth unit;
an increment of the size of the IP header when executing the authentication processing by the fifth unit;
an increment of the size of the IP header when executing the authentication processing by the sixth unit;
an increment of the size of the IP header when executing the authentication processing by the seventh unit; and
an increment of the size of the IP header when executing the authentication processing by the eighth unit;
and does not store the other increments; and
wherein the setting unit is further configured to set a size of data to be transmitted to the other communication apparatus using a packet, based on the increased size stored in the third area, when executing the encryption and authentication processing based on the third IPSec protocol, regardless of whether the encryption and authentication processing is executed by any one of the fifth to eighth units.

9. A method for controlling a communication apparatus that includes a memory, the method comprising:
a first step of executing encryption processing based on a first IPSec protocol using a first encryption algorithm;
a second step of executing encryption processing based on the first IPSec protocol using a second encryption algorithm;
a third step of executing authentication processing based on a second IPSec protocol using a first authentication algorithm;

a fourth step of executing authentication processing based on the second IPSec protocol using a second authentication algorithm;
wherein a first area of the memory stores the larger one of (i) an increment of a size of an IP header when executing the encryption processing in the first step and (ii) an increment of the size of the IP header when executing the encryption processing in the second step, and does not store the other one;
wherein a second area of the memory stores the larger one of (a) an increment of the size of the IP header when executing the authentication processing in the third step and (b) an increment of the size of the IP header when executing the authentication processing in the fourth step, and does not store the other one;
a setting step of:
  setting a size of data to be transmitted to another communication apparatus using a packet, based on the increased size stored in the first area, when executing the encryption processing based on the first IPSec protocol, regardless of whether the encryption processing is executed in the first step or in the second step; and
  setting a size of data to be transmitted to the other communication apparatus using a packet, based on the increased size stored in the second area, when executing the authentication processing based on the second IPSec protocol, regardless of whether the authentication processing is executed in the third step or in the fourth step; and
a transmission step of transmitting the packet including data which does not exceed the set size to the other communication apparatus.

10. A non-transitory storage medium storing a computer program for controlling a communication apparatus that includes a memory, the program comprising code for causing the communication apparatus to perform:
  a first step of executing encryption processing based on a first IPSec protocol using a first encryption algorithm;
  a second step of executing encryption processing based on the first IPSec protocol using a second encryption algorithm;
  a third step of executing authentication processing based on a second IPSec protocol using a first authentication algorithm;
  a fourth step of executing authentication processing based on the second IPSec protocol using a second authentication algorithm;
  wherein a first area of the memory stores the larger one of (i) an increment of a size of an IP header when executing the encryption processing in the first step and (ii) an increment of the size of the IP header when executing the encryption processing in the second step, and does not store the other one;
  wherein a second area of the memory stores the larger one of (a) an increment of the size of the IP header when executing the authentication processing in the third step and (b) an increment of the size of the IP header when executing the authentication processing in the fourth step, and does not store the other one;
  a setting step of:
    setting a size of data to be transmitted to another communication apparatus using a packet, based on the increased size stored in the first area, when executing the encryption processing based on the first IPSec protocol, regardless of whether the encryption processing is executed in the first step or in the second step; and
    setting a size of data to be transmitted to the other communication apparatus using a packet, based on the increased size stored in the second area, when executing the authentication processing based on the second IPSec protocol, regardless of whether the authentication processing is executed in the third step or in the fourth step; and
  a transmission step of transmitting the packet including data which does not exceed the set size to the other communication apparatus.

* * * * *